United States Patent
Redmond

(10) Patent No.: US 10,110,570 B2
(45) Date of Patent: *Oct. 23, 2018

(54) PROVIDING LOAD BALANCED SECURE MEDIA CONTENT AND DATA DELIVERY IN A DISTRIBUTED COMPUTING ENVIRONMENT

(71) Applicant: Content Delivery Inc., Costa Mesa, CA (US)

(72) Inventor: Scott D. Redmond, San Francisco, CA (US)

(73) Assignee: Content Delivery Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,577

(22) Filed: Aug. 8, 2017

(65) Prior Publication Data

US 2017/0366517 A1    Dec. 21, 2017

Related U.S. Application Data

(63) Continuation of application No. 15/075,037, filed on Mar. 18, 2016, now Pat. No. 9,762,550, which is a
(Continued)

(51) Int. Cl.
*H04L 29/06* (2006.01)
*H04N 7/16* (2011.01)
(Continued)

(52) U.S. Cl.
CPC .... *H04L 63/0428* (2013.01); *H04L 29/06027* (2013.01); *H04L 63/0457* (2013.01);
(Continued)

(58) Field of Classification Search
CPC ... H04L 63/0428; H04L 63/06; H04L 63/062; H04L 63/0457; H04L 29/06027;
(Continued)

(56) References Cited

U.S. PATENT DOCUMENTS 5,132,992 A    7/1992    Yurt et al.
5,253,275 A    10/1993   Yurt et al.
(Continued)

OTHER PUBLICATIONS

Dilley, John et al., "Globally Distributed Content Delivery," Carnegei Mellon University Research Showcase—Computer Science Department [online], URL: <http://repository.cmu.edu/cgi/iewcontent.dg/?article=2112&,context=compsci/John Dilley/2002/>, pp. 50-58, Sep. 1, 2002.
(Continued)

*Primary Examiner* — Mahfuzur Rahman
(74) *Attorney, Agent, or Firm* — Carr & Ferrell LLP

(57) ABSTRACT

A system and method for providing load balanced secure media content and data delivery in a distributed computing environment is disclosed. Media content is segmented and encrypted into a set of individual encrypted segments on a centralized control center. Each individual encrypted segment has the same fixed size. The complete set of individual encrypted segments is staged to a plurality of intermediate control nodes. Individual encrypted segments are mirrored from the staged complete set to a plurality of intermediate servers. Requests are received from clients for the media content at the centralized control center. Each individual encrypted segment in the set is received from one of an intermediate control node and an intermediate server optimally sited from the requesting client. The individual encrypted segments are reassembled into the media content for media playback.

19 Claims, 17 Drawing Sheets

Related U.S. Application Data continuation of application No. 14/632,172, filed on Feb. 26, 2015, now Pat. No. 9,294,449, which is a continuation of application No. 13/938,823, filed on Jul. 10, 2013, now Pat. No. 8,972,718, which is a continuation of application No. 11/663,397, filed as application No. PCT/US02/00332 on Jan. 2, 2002, now Pat. No. 8,615,652.

(60) Provisional application No. 60/262,529, filed on Jan. 17, 2001, provisional application No. 60/259,503, filed on Jan. 2, 2001.

(51) Int. Cl.

| | | |
|---|---|---|
| H04N 21/222 | (2011.01) | |
| H04N 21/231 | (2011.01) | |
| H04N 21/2347 | (2011.01) | |
| H04N 21/258 | (2011.01) | |
| H04N 21/45 | (2011.01) | |
| H04N 21/454 | (2011.01) | |
| H04N 21/6405 | (2011.01) | |
| H04N 21/6408 | (2011.01) | |
| H04N 21/658 | (2011.01) | |
| H04N 21/6587 | (2011.01) | |
| H04N 21/81 | (2011.01) | |
| H04N 21/845 | (2011.01) | |
| H04L 29/08 | (2006.01) | |
| H04N 21/218 | (2011.01) | |
| H04N 21/239 | (2011.01) | |
| H04N 21/4405 | (2011.01) | |

(52) U.S. Cl.
CPC .......... *H04L 63/06* (2013.01); *H04L 63/062* (2013.01); *H04L 65/4076* (2013.01); *H04L 67/101* (2013.01); *H04L 67/1002* (2013.01); *H04L 67/104* (2013.01); *H04L 67/1095* (2013.01); *H04L 67/306* (2013.01); *H04N 7/162* (2013.01); *H04N 21/2181* (2013.01); *H04N 21/222* (2013.01); *H04N 21/2223* (2013.01); *H04N 21/2347* (2013.01); *H04N 21/2393* (2013.01); *H04N 21/23103* (2013.01); *H04N 21/23476* (2013.01); *H04N 21/25891* (2013.01); *H04N 21/44055* (2013.01); *H04N 21/454* (2013.01); *H04N 21/4532* (2013.01); *H04N 21/6405* (2013.01); *H04N 21/6408* (2013.01); *H04N 21/6581* (2013.01); *H04N 21/6587* (2013.01); *H04N 21/812* (2013.01); *H04N 21/8456* (2013.01); *H04L 67/1029* (2013.01); *H04L 69/329* (2013.01); *H04L 2463/101* (2013.01)

(58) Field of Classification Search
CPC . H04L 67/1002; H04L 67/101; H04L 67/306; H04L 67/1095; H04L 67/104; H04L 65/4076; H04L 67/1029; H04L 2463/101; H04L 69/329; H04N 21/2223; H04N 21/23476; H04N 21/2393; H04N 21/2181; H04N 7/162; H04N 21/44055; H04N 21/812; H04N 21/6587; H04N 21/6581; H04N 21/6408; H04N 21/6405; H04N 21/454; H04N 21/4532; H04N 21/25891; H04N 21/2347; H04N 21/23103; H04N 21/222; H04N 21/8456

See application file for complete search history.

(56) References Cited

U.S. PATENT DOCUMENTS

| | | |
|---|---|---|
| 5,420,942 A | 5/1995 | Levit |
| 5,550,863 A | 8/1996 | Yurt et al. |
| 5,758,085 A | 5/1998 | Kouoheris et al. |
| 5,778,187 A | 7/1998 | Monteiro et al. |
| 5,805,825 A | 9/1998 | Danneels et al. |
| 5,835,861 A | 11/1998 | Whiteside |
| 5,893,083 A | 4/1999 | Eshghi et al. |
| 5,903,548 A | 5/1999 | Delamater |
| 5,983,073 A | 11/1999 | Ditzik |
| 5,995,938 A | 11/1999 | Whaley |
| 6,021,432 A | 2/2000 | Sizer, II et al. |
| 6,112,186 A | 8/2000 | Bergh et al. |
| 6,154,744 A | 11/2000 | Kenner et al. |
| 6,202,058 B1 | 3/2001 | Rose et al. |
| 6,202,060 B1 | 3/2001 | Tran |
| D451,096 S | 11/2001 | Redmond |
| 6,314,525 B1 * | 11/2001 | Mahalingham ..... H04L 12/2856 370/217 |
| 6,370,139 B2 | 4/2002 | Redmond |
| 6,415,280 B1 | 7/2002 | Farber et al. |
| 6,434,535 B1 | 8/2002 | Kupka et al. |
| 6,536,043 B1 | 3/2003 | Guedalia |
| 6,601,084 B1 | 7/2003 | Bhaskaran et al. |
| 6,874,037 B1 | 3/2005 | Abram et al. |
| 6,928,442 B2 | 8/2005 | Farber et al. |
| 7,002,971 B1 * | 2/2006 | Enns ..................... H04H 20/42 348/E7.07 |
| 7,089,293 B2 | 8/2006 | Grosner et al. |
| 7,170,999 B1 * | 1/2007 | Kessler ................. G06F 21/606 380/201 |
| 7,301,944 B1 | 11/2007 | Redmond |
| 7,334,044 B1 | 2/2008 | Allen |
| 7,483,839 B2 | 1/2009 | Mayaud |
| 8,615,652 B2 | 12/2013 | Redmond |
| 8,972,718 B2 | 3/2015 | Redmond |
| 9,294,449 B2 | 3/2016 | Redmond |
| 9,762,550 B2 | 9/2017 | Redmond |
| 2001/0043599 A1 | 11/2001 | Redmond |
| 2002/0062333 A1 | 5/2002 | Anand et al. |
| 2002/0107962 A1 | 8/2002 | Richter et al. |
| 2002/0107971 A1 | 8/2002 | Bailey et al. |
| 2002/0116452 A1 | 8/2002 | Johnson et al. |
| 2002/0144153 A1 | 10/2002 | LeVine et al. |
| 2004/0071157 A1 | 4/2004 | Feldman et al. |
| 2005/0144296 A1 | 6/2005 | Monroe et al. |
| 2007/0108073 A1 | 5/2007 | Redmond |
| 2009/0010426 A1 | 1/2009 | Redmond |
| 2013/0297932 A1 | 11/2013 | Redmond |
| 2015/0188892 A1 | 7/2015 | Redmond |
| 2016/0205077 A1 | 7/2016 | Redmond |

OTHER PUBLICATIONS

Non-Final Office Action, dated May 26, 2010, U.S. Appl. No. 11/663,397, filed Jun. 5, 2008.
Final Office Action, dated Feb. 18, 2011, U.S. Appl. No. 11/663,397, filed Jun. 5, 2008.
Notice of Allowance, dated Jun. 20, 2013, U.S. Appl. No. 11/663,397, filed Jun. 5, 2008.
Final Office Action, dated Mar. 9, 2011, U.S. Pat. No. 9/753,768, filed Jan. 2, 2001.
Non-Final Office Action, dated Apr. 25, 2014, U.S. Appl. No. 13/938,823, filed Jul. 10, 2013.
Notice of Allowance, dated Dec. 15, 2014, U.S. Appl. No. 13/938,823, filed Jul. 10, 2013.
Final Office Action, dated Jul. 12, 2010, U.S. Appl. No. 11/663,397, filed Oct. 28, 2007.
Final Office Action, dated Sep. 10, 2009, U.S. Appl. No. 10/118,458, filed Apr. 8, 2002.
Non-Final Office Action, dated Dec. 30, 2009, U.S. Appl. No. 10/118,458, filed Apr. 8, 2002.
Notice of Allowance, dated Sep. 15, 2015, U.S. Appl. No. 14/632,172, filed Feb. 26, 2015.

(56) References Cited

OTHER PUBLICATIONS

Non-Final Office Action, dated Oct. 5, 2016, U.S. Appl. No. 15/075,037, filed Oct. 5, 2016.
Notice of Allowance, dated Apr. 24, 2017, U.S. Appl. No. 15/075,037, filed Oct. 5, 2016.

* cited by examiner

| Certificate Serial No. (181) || Customer No. (182) |
|---|---|---|
| Create Date/Time (183) | Expire Date/Time (184) | Movie Title No. (185) |
| No. of Plays (186) | Reserved (187) ||
| Movie Key (Part I) (188) |||
| Certificate Signature (189) |||

| Certificate Serial No. (201) || Customer No. (202) |
|---|---|---|
| Create Date/Time (203) | Expire Date/Time (204) | Movie Title No. (205) |
| Reserved (206) |||
| Movie Key (Part 2) (207) |||
| Certificate Signature (208) |||

| Source (221) | Destination (222) |
|---|---|
| Packet Length (223) | Checksum (224) |
| Type (225) ||
| Data Owner (226) ||
| Sequence No. (227) ||
| Header Extensions (228) ||
| Data (229) ||

PROVIDING LOAD BALANCED SECURE MEDIA CONTENT AND DATA DELIVERY IN A DISTRIBUTED COMPUTING ENVIRONMENT

CROSS-REFERENCE TO RELATED APPLICATIONS

This patent application is a continuation of U.S. patent application Ser. No. 15/075,037, filed Mar. 18, 2016, which is a continuation of U.S. patent application Ser. No. 14/632,172, filed Feb. 26, 2015, and issued on Mar. 22, 2016 as U.S. Pat. No. 9,294,449, which is a continuation of U.S. patent application Ser. No. 13/938,823, filed on Jul. 10, 2013, and issued on Mar. 3, 2015 as U.S. Pat. No. 8,972,718, which is a continuation of U.S. patent application Ser. No. 11/663,397, filed on Jun. 5, 2008, and issued on Dec. 24, 2013 as U.S. Pat. No. 8,615,652, which is the National Stage of International Application No. PCT/US02/00332, filed on Jan. 2, 2002, which claims the benefit of U.S. provisional patent applications, Ser. No. 60/259,503, filed Jan. 2, 2001; and Ser. No. 60/262,529, filed Jan. 17, 2001; the priority dates of which are claimed pursuant to 35 U.S.C. § 119(e). The disclosures of all the above-referenced patent applications are incorporated by reference.

TECHNICAL FIELD

The present invention relates in general to media content delivery and, in particular, to a system and method for providing load balanced secure media content delivery in a distributed computing environment.

BACKGROUND OF THE INVENTION

Television is the most widely available form of mass audiovisual communications in use today. The basic format of television is relatively mature, consisting primarily of television network-operated transmission stations sending programming signals to passive receivers or "sets." Media content, in the form of television shows and advertising, are transmitted over specific radio frequencies and program selection is limited to the programming broadcast at any given time.

Cable- and satellite-based television network services offer an alternative to conventional radio frequency-based television programming. Both formats offer superior reception quality and provide an extensive selection of media content by airing a wider range of television channels. Of late, these network services have begun to offer "pay-per-view" programming services. Using set-top boxes, subscribers can purchase time-restricted access to view content made available on controlled television channels. Popular content includes first run movies and sporting events. Although more flexible than conventional television, "pay-per-view" formats only provide access to the additional content aired by the cable or satellite networks at specific show times on standard television sets and are not broadcast via other means.

Recognizing this shortfall, media content providers operating over internetworks, and specifically, the Internet, have begun to offer downloadable media content as an alternative to television broadcast programming. Live media content is aired as streaming media and static, pre-recorded media content is staged on content servers for retrieval and playback by clients on demand. Television, as well as radio, programming is also available. To view media content over an internetwork, users use a Web browser to navigate to the desired media content and then execute a media playback application within the Web browser to download and view the selected shows and other content.

Although more customizable than standard television programming, Internet-based "media-on-demand" (henceforth, simply "media-on-demand") services suffer from numerous shortcomings. The most apparent shortcoming is a drastic difference in viewing experience. Personal computer displays offer a higher resolution than standard NTSC television sets. This difference negatively affects the appearance of media content. Moreover, Web browser-based media playback applications display media at low resolutions in small viewing windows with low fidelity sound, thereby further degrading the viewing experience.

As well, media-on-demand is network infrastructure-sensitive. Media content is generally downloaded as a series of streamed serialized packets. To improve throughput, the loss of individual packets can be tolerated to a certain degree at the expense of distortion during playback. However, media content delivery is contingent on the continued availability of the content server and is subject to bandwidth and network load constraints. As well, delivery is further limited by the processing capability of each client.

In addition, most media content is subject to copyright and other forms of digital rights protections. However, media content is often staged with little or no privilege or access safeguards. Content is freely available for downloading and viewing without significant copying or distribution protections. Once downloaded, redistribution consequently becomes uncontrollable and infringements virtually impossible to police.

Similarly, media-on-demand further lacks electronic commerce (e-commerce) and electronic business (e-business) support. For example, e-commerce concerns conducting on-line transactions over an internetwork and e-business concerns running a business based on an network-centric business model. However, users generally request media from a content server with minimal interaction. With few exceptions, no transaction processing, order management, or advertising and product targeting take place. Media content is simply downloaded and viewed with potential business opportunities lost.

In the prior art, direct download and media content streaming are the two predominant forms of media content retrieval. Direct download involves the retrieval of media content from a content server en masse. The user browses available data files containing media content and downloads a media content selection in the same way as any other file. This approach is slow and inefficient, as content is unicast from the content server to the requesting client in a one-to-one connection. Furthermore, less bandwidth-capable clients suffer further, as most content servers are architected to service the fastest connections first.

Media content streaming involves the delivery of media content in a series of individual packets at a data rate preferably exceeding the rate of consumption. Individual packets are received in serial order and stored in a temporary buffer until the requesting client has received packets sufficient to enable playback. However, streaming is bandwidth-dependent and also unicast.

Therefore, there is a need for an approach to delivering full-function, full-motion media-on-demand in a distributed computing environment. Preferably, such an approach would provide secure reliable content delivery through a hierarchical media service infrastructure.

There is a further need for an approach to serving media content via a distributed network framework incorporating fault tolerance and dynamic load balancing. Preferably, such an approach would offer content provider support functions including user profiling and e-commerce and e-business management.

SUMMARY

The present invention provides a system and method for delivering encrypted segmented media content to individual clients through a dynamically load balanced network framework. Media content is encoded to a uniform format and is segmented and encrypted, preferably using one unique key per segment. A centralized control center, known as a Neuro Center, stages complete sets of the segmented encrypted media content to intermediate control nodes, known as Neuro Nodes, dispersed throughout the network. The Neuro Nodes then mirror select individual encrypted segments to intermediate servers, known as Edge Servers, and, in a further embodiment, to individual clients, known as Smart Clients. The Smart Clients may include client computers which are used as intermediaries in the system. The Edge Servers and Smart Clients maintain the mirrored individual encrypted segments for eventual delivery to requesting Smart Clients. Via a client, a user requests delivery of media content from the centralized control center, which validates the request and furnishes a validation certificate enabling delivery of the requested content. The client then requests each individual encrypted segment from either an intermediate control node, intermediate server, or, in a further embodiment, a peer client, on a segment-by-segment basis, based on network load and component availability. Playback of the delivered media content begins upon the receipt of sufficient individual encrypted segments.

An embodiment of the invention provides a system and method for providing load balanced secure media content delivery in a distributed computing environment. Media content is segmented and encrypted into a set of individual encrypted segments on a centralized control center. Each individual encrypted segment can be either fixed or variable in size. The complete set of individual encrypted segments is staged to a plurality of intermediate control nodes. Individual encrypted segments are mirrored from the staged complete set to a plurality of intermediate servers. Requests are received from clients for the media content at the centralized control center. Each individual encrypted segment in the set is received from one of an intermediate control node and an intermediate server optimally sited from the requesting client. The individual encrypted segments are reassembled into the media content for media playback. The segments may be received from different servers in non-sequential order. The requesting client should acquire the first segment from whichever of the intermediate control node or intermediate server that can deliver the first segment fastest, thus providing an immediate-playback start capability.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DESCRIPTION OF THE DRAWINGS

FIG. 9 is a data structure diagram showing a play ticket used by the system of FIG. 1.

FIG. 10 is a data structure diagram showing a validation certificate used by the system of FIG. 1.

FIG. 11 is a data structure diagram showing a packet header used by the system of FIG. 1.

DETAILED DESCRIPTION

Figure 1:
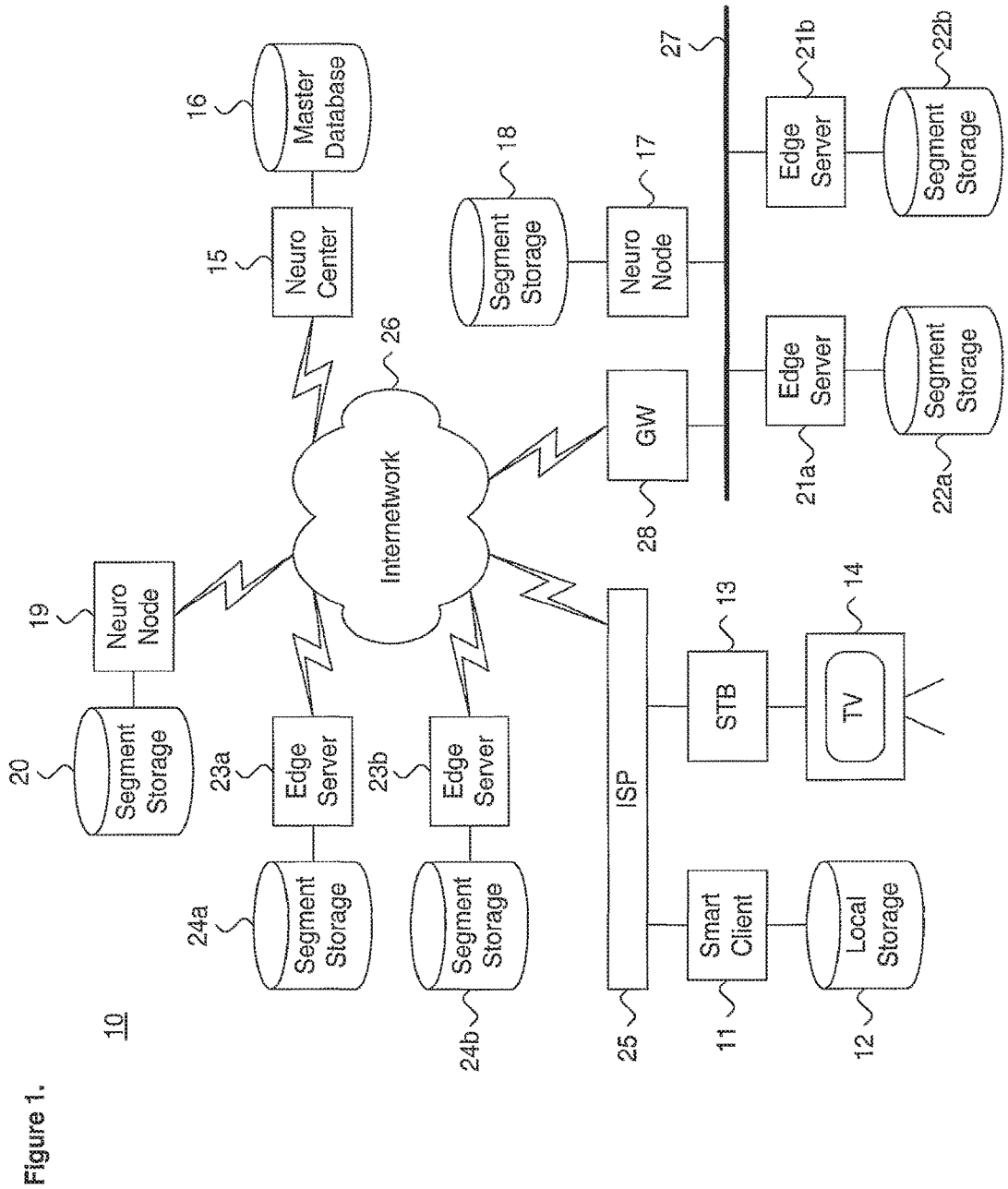
FIG. 1 is a block diagram showing a system for providing load balanced secure media content delivery in a distributed computing environment.

FIG. 1 is a block diagram showing a system 10 for providing load balanced secure media content delivery in a distributed computing environment. Media content is delivered as individual encrypted segments to a Smart Client 11 or, alternatively, to a set-top box (STV) 13 for airing on a television set (TV) 14. The Smart Client 11 provides media viewing playback capabilities to personal computers, wireless devices, public display kiosks, and the like. The Smart Client 11 includes a local storage 12 in which the segments are transitorily stored. Henceforth, for clarity of discussion, media content delivery will be described with reference to the Smart Client 11 only, although one skilled in the art would recognize that a similar form of delivery would apply to a set-top box 13 or similar media access device. The Smart Client 11 is further described below with reference to FIG. 8.

The Smart Client 11 initiates the media content delivery process by sending a request to a Neuro Center 15. The Neuro Center 15 centrally manages all requests for media content and is accessible via an internetwork 26, including the Internet, or similar broadband wide area network. The Smart Client 11 interfaces to the internetwork 26 through an Internet Service Provider 25 (ISP) or via direct connection (not shown). The Neuro Center 15 maintains a master database 16 in which individual users are profiled and e-commerce and e-business management data are maintained. Upon validating each client request, the Neuro Center 15 requests the Smart Client 11 to check the network and commence media content delivery. The Neuro Center 15 is further described below with reference to FIG. 5.

The actual media content is stored as individual encrypted segments on Neuro Nodes 17 and 19 and Edge Servers 21a-b and 23a-b. Neuro Node 17 and Edge Servers 21a-b are locally interfaced via an intranetwork 27 and are interfaced to the Neuro Center 15 via a gateway (GW) 28 interfacing to the internetwork 26. Neuro Node 19 and Edge Server 23a-b directly interface to the Neuro Center 15 via the internetwork 26. Other configurations and network topologies are feasible, as would be recognized by one skilled in the art.

The Neuro Nodes 17 and 19 maintain segment storages 18 and 20, respectively, in which complete sets of individual encrypted segments comprising a complete (or portion of a) media selection are stored. The Edge Servers 21a-b and 23a-b also maintain segment storages 22a-b and 24a-b, respectively, in which mirrored segments are maintained. The Neuro Nodes 17 and 19 selectively copy or "mirror" segments to the Edge Servers 21a-b and 23a-b to optimally balance the distribution of individual encrypted segments throughout the network. Neuro Nodes 17 and 19 are further described below with reference to FIG. 6 and Edge Servers 21a-b and 23a-b are further described below with reference to FIG. 7.

The individual computer systems, including Neuro Center 15, Neuro Nodes 17 and 19, Edge Servers 21a-b, and 23a-b, and Smart Client 11, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs and data, are loaded into the RAM for execution and processing by the CPU and results are generated for display, output, transmittal, or storage.

Figure 2:
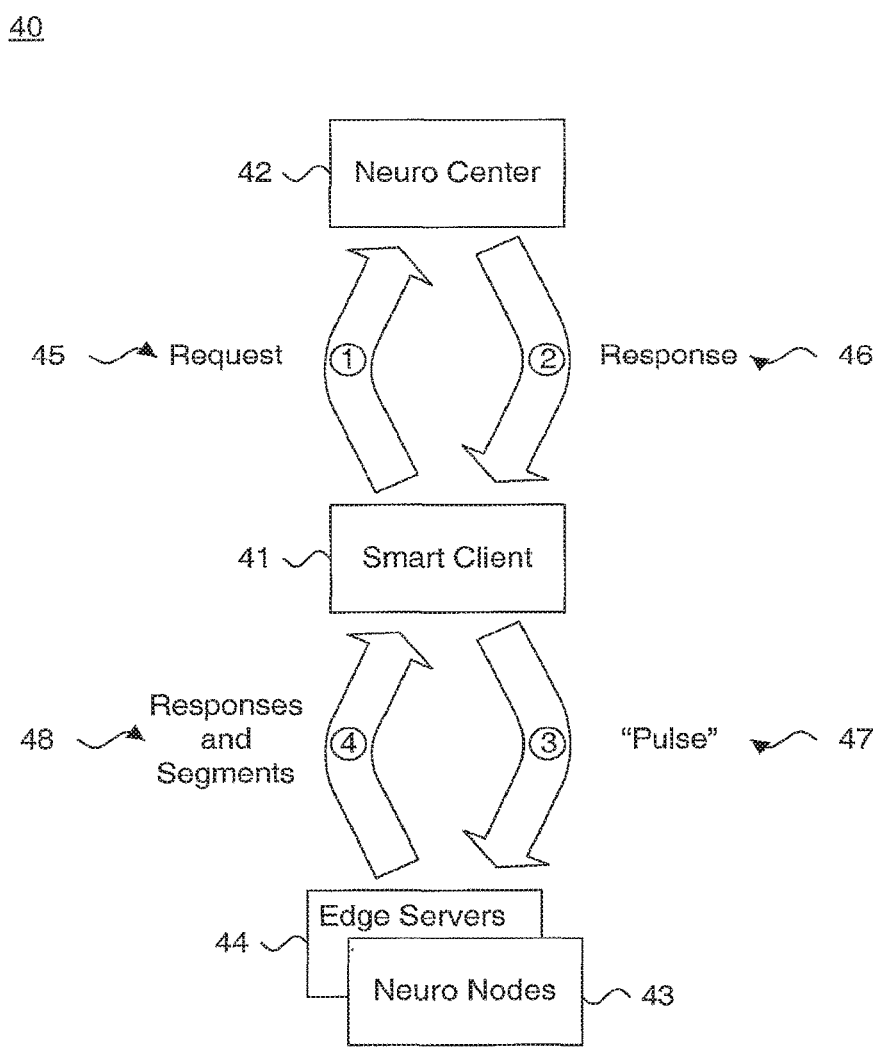
FIG. 2 is a process flow diagram showing load balanced secure media content delivery via the system of FIG. 1.

FIG. 2 is a process flow diagram showing load balanced secure media content delivery 40 via the system of FIG. 1. The key to achieving dynamic load balancing is through the continuous determination of network throughput and load characteristics using client-generated "pulses" A pulse is generated prior to requesting each individual encrypted segment to identify an optimally sited Neuro Node or Edge Server from which to request the segment. Media content delivery begins with a Smart Client 41 sending a request 45 to a Neuro Center 42 (step {circle around (1)}). In response, the Neuro Center 42 validates the client request 45 and sends a response 46 requesting the Smart Client to "pulse" the network status prior to commencing delivery (step {circle around (2)}).

The requested media content is delivered in individual encrypted segments received from Neuro Nodes 43 and Edge Servers 44. Prior to receiving each segment, Smart Client 41 broadcasts a "pulse" 47 over the network to determine the load and operational status of the various Neuro Nodes 43 and Edge Servers 44 (step {circle around (3)}). The Smart Client 41 receives "pulse" responses and segments 48 back from the Neuro Nodes 43 and Edge Servers 44 (step {circle around (4)}). The Neuro Center 42 manages encryption and security in the background to media content delivery.

The "pulse" responses indicate the network load and relative status of each network component while each segment contains a portion of the actual requested media content. The Smart Client 41 reassembles the individual encrypted segments and begins media playback upon receiving a sufficient number of segments. The Smart Client 41 decrypts and decompresses each segment and provides a full-featured, full-motion playback. Note the segments need not be received in serial order and can be (and in practice, often are) requested from different Neuro Nodes 43 and Edge Servers 44, depending on network load and component status.

Figure 3:
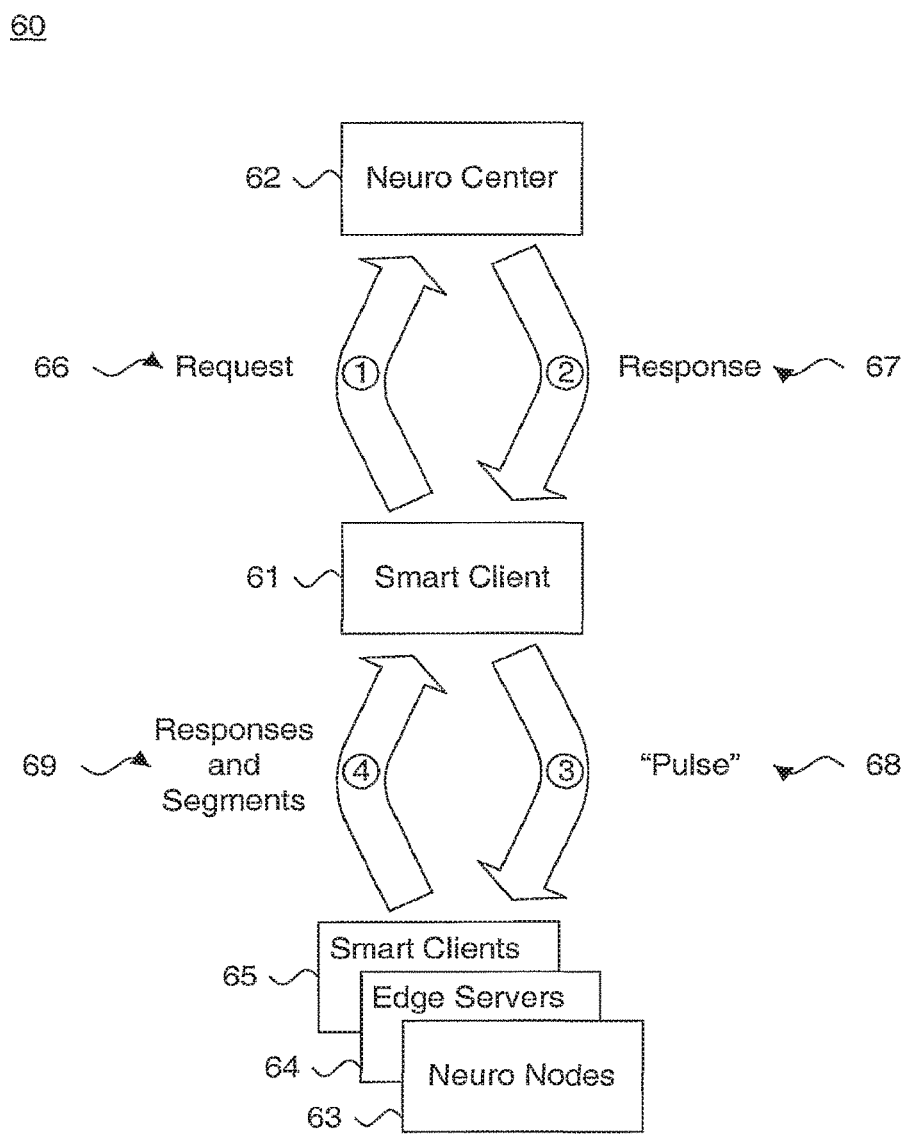
FIG. 3 is a process flow diagram showing load balanced secure media content delivery with peer-to-peer intercommunication in accordance with a further embodiment.

FIG. 3 is a process flow diagram showing load balanced secure media content delivery with peer-to-peer intercommunication 60 in accordance with a further embodiment. The Smart Client 61 takes advantage of media content already made available on peer Smart Client 65 through peer-to-peer segment sharing. This approach improves file delivery capabilities and provides a highly scalable network with a rich intermediate content server population.

As before, a Smart Client 61 sends a request 66 to a Neuro Center 62 to initiate media content delivery (step {circle around (1)}). The Neuro Center 62 validates the request and sends a response 67 requesting the Smart Client 61 to "pulse" the network (step {circle around (2)}). The Smart Client 61 broadcasts a "pulse" 68 over the network to the Neuro Nodes 63, Edge Server 64 and other Smart Clients 65 (step {circle around (3)}). These components send back responses and segments 69 (step {circle around (4)}) as above.

Figure 4:
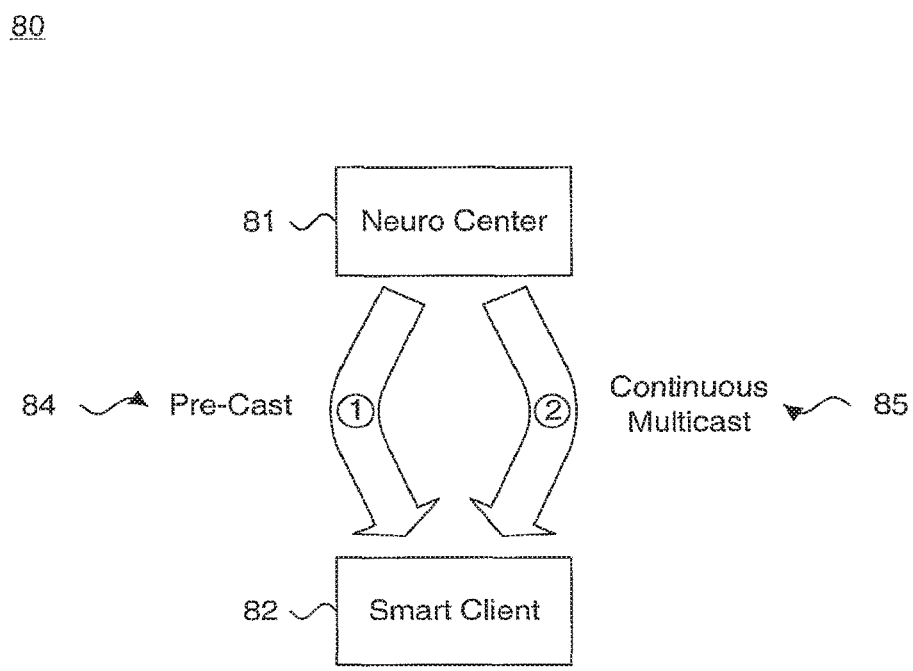
FIG. 4 is a process flow diagram showing load balanced secure media content delivery with pre-casted media content staging in accordance with a further embodiment.

FIG. 4 is a process flow diagram showing load balanced secure media content delivery with pre-casted media content staging 80 in accordance with a further embodiment. Ordinarily, a Neuro Center 81 is only initially involved in media content delivery during the validation of individual user requests. However, to substantially minimize the delay attendant to media content delivery during peak demand times, the Neuro Center 81 can pre-cast 84 (step {circle around (1)}) media content to each Smart Client 82 during off-peak times. The initial segments of popular media content are thereby staged at individual Smart Clients 82 for immediate playback by a user without incurring a delay due to network load and demand. Once playback begins, the remaining segments are sent to each Smart Client 82 in a continuous multicast 85 from the Neuro Center 81 (step {circle around (2)}).

Figure 5:
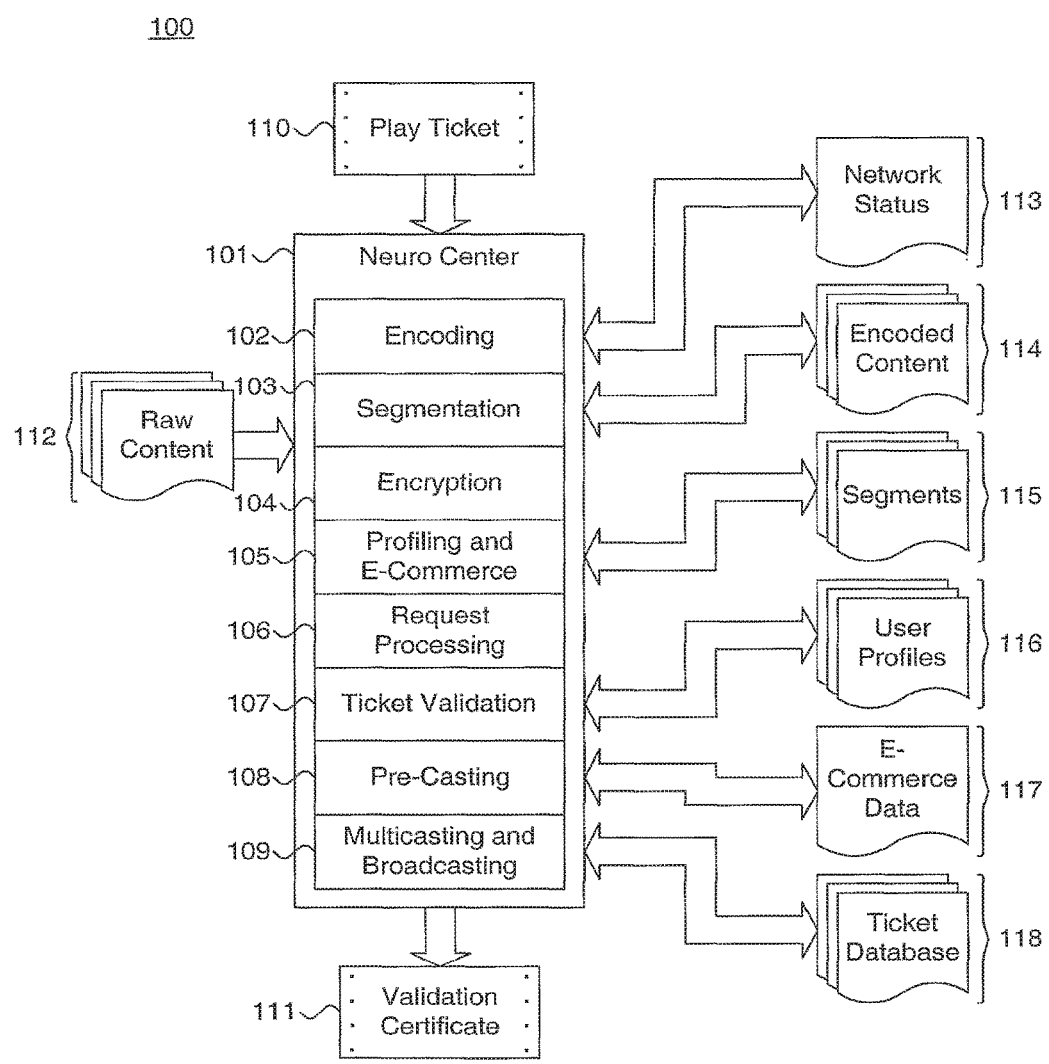
FIG. 5 is a block diagram showing the software modules of the Neuro Center of FIG. 1.

FIG. 5 is a block diagram showing the software modules 100 of the Neuro Center 101 of FIG. 1. The Neuro Center 101 functions as a centralized control center and is primarily responsible for preparing raw media content 112 for distribution as individual encrypted segments 115 and for validating individual user requests. The Neuro Center 101 includes: encoding module 102, segmentation module 103, encryption module 104, profiling and e-commerce module 105, request processing module 106, ticket validation module 107, pre-casting module 108, and multicasting and broadcasting module 109.

The encoding module 102 receives raw media content 112 from a variety of diverse sources, including the Internet, satellite and cable feeds, wireless devices, and next-generation media sources. The raw media content 112 is converted into a standardized form of encoded content 114. In turn, the segmentation module 103 segments the encoded content 114 into sets of individual segments 115 which are then encrypted by the encryption module 104, preferably using a different unique key for each individual segment. The complete sets of individual encrypted segments 115 are then broadcast by the multicasting and broadcasting module 109 to the Neuro Nodes (shown in FIG. 1) for mirroring to Edge Servers and, in a further embodiment, Smart Clients.

Individual users request media content delivery by sending a play ticket 110, as further described below with reference to FIG. 9. The play ticket 110 identifies the user and requested media content. The request processing module 106 processes each request and the ticket validation module 107 validates the play ticket 110. The ticket validation module 107 accesses a ticket database 118 to validate the play ticket 110 and generate a validation certificate 111 which is sent back to the requesting client. The profiling and e-commerce module 105 accesses user profiles 116 and e-commerce data 117 to provide demographics tracking and order management. As well, advertising and product targeting can be delivered via the profiling and e-commerce module 105.

The pre-casting module 108 is used in a further embodiment to stage the initial segments of popular media content to the individual Smart Clients during off-peak times. Finally, the multicasting and broadcasting module 109 sends sets of segments 115, as well as individual encrypted segments 115, to a select subset of network components (multicasting) or to all network components (broadcasting). The Neuro Center 101 monitors network status 113 in the background.

Figure 6:
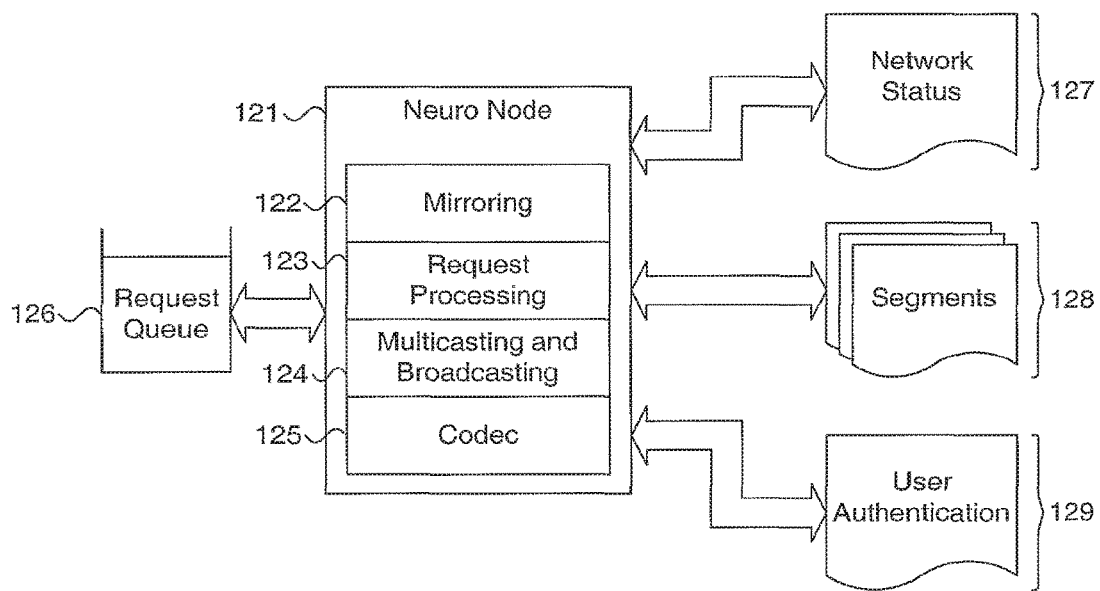
FIG. 6 is a block diagram showing the software modules of a Neuro Node of FIG. 1.

FIG. 6 is a block diagram showing the software modules 120 of a Neuro Node 121 of FIG. 1. Each Neuro Node 121 functions as an intermediate control node within the network. The Neuro Center (shown in FIG. 1) sends complete sets of individual encrypted segments, collectively constituting a complete work, to each Neuro Node 121 for staging and mirroring. Each Neuro Node 121 includes: mirroring module 122, request processing module 123, multicasting and broadcasting module 124, and codec module 125.

The mirroring module 122 selectively stages individual encrypted segments 128 to Edge Servers and, in a further embodiment, Smart Clients. The segments are distributed throughout the network to maximize load balancing and fault tolerance. The request processing module 123 receives incoming requests from individual Smart Client. The requests are staged in a request queue 126. The multicasting and broadcasting module 124 sends a requested segment 128 if the Neuro Node 121 is optimally sited relative to the requesting Smart Client. Alternatively, a plurality of individual client requests for the same segment 128 can be stored in the request queue 126 and fulfilled en masse by the multicasting and broadcasting module 124. The advantage of staging multiple client requests is network throughput efficiency. The request processing module 123 authenticates each user through a user authentication table 129. The Neuro Node 121 monitors the network status 127 in the background. The codec 125 compresses individual encrypted segments 128 prior to delivery to a Smart Client.

Figure 7:
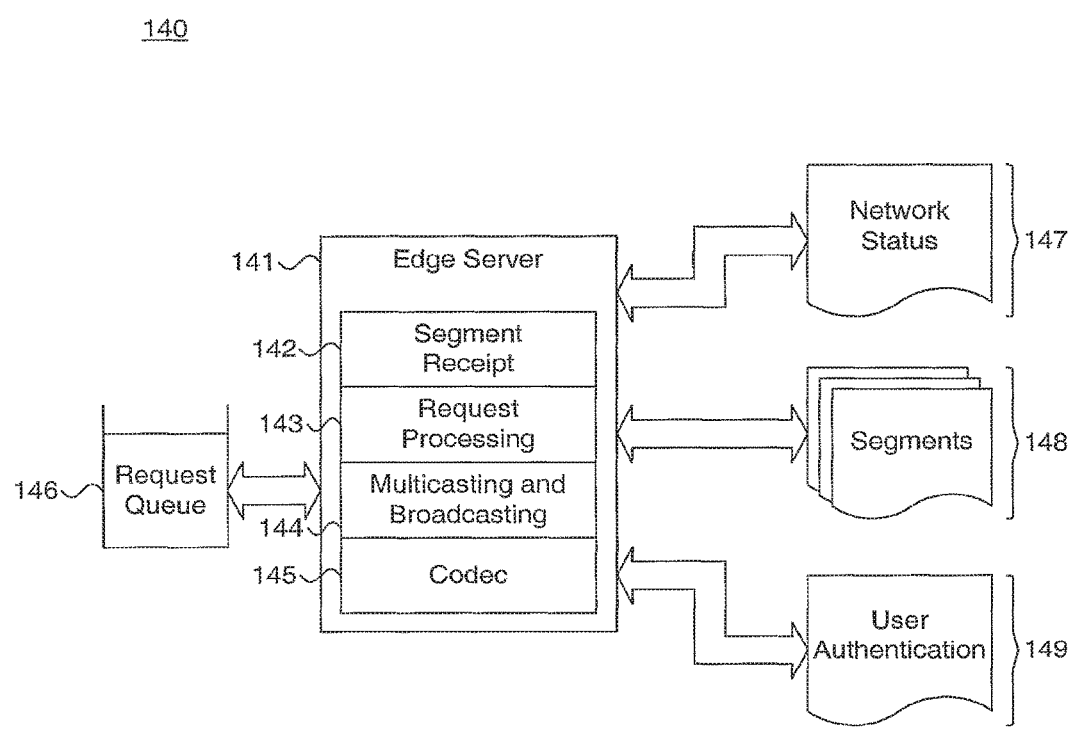
FIG. 7 is a block diagram showing the software modules of an Edge Server of FIG. 1.

FIG. 7 is a block diagram showing the software modules 140 of an Edge Server 141 of FIG. 1. Each Edge Server 141 functions as an intermediate server within the network. The Neuro Nodes (shown in FIG. 1) mirror select individual encrypted segments to each Edge Server 141 for staging. Each Edge Server 141 includes: request processing module 143, segment receipt module 142, multicasting and broadcasting module 144, and codec module 145. The segment receipt module 142 receives individual encrypted mirrored segments 148 selectively staged by the Neuro Nodes.

The request processing module 143 receives incoming requests from individual Smart Clients. The requests are staged in a request queue 146. The Edge Server 141 sends a mirrored requested segment 148 if the Edge Server 141 is optimally sited relative to the requesting Smart Client. Alternatively, a plurality of individual client requests for the same mirrored segment 148 can be stored in the request queue 146 and fulfilled en masse by the multicasting and broadcasting module 144. The advantage of staging multiple client requests is network throughput efficiency. The request processing module 143 authenticates each user through a user authentication table 149. The Edge Server 141 monitors the network status 147 in the background.

Figure 8:
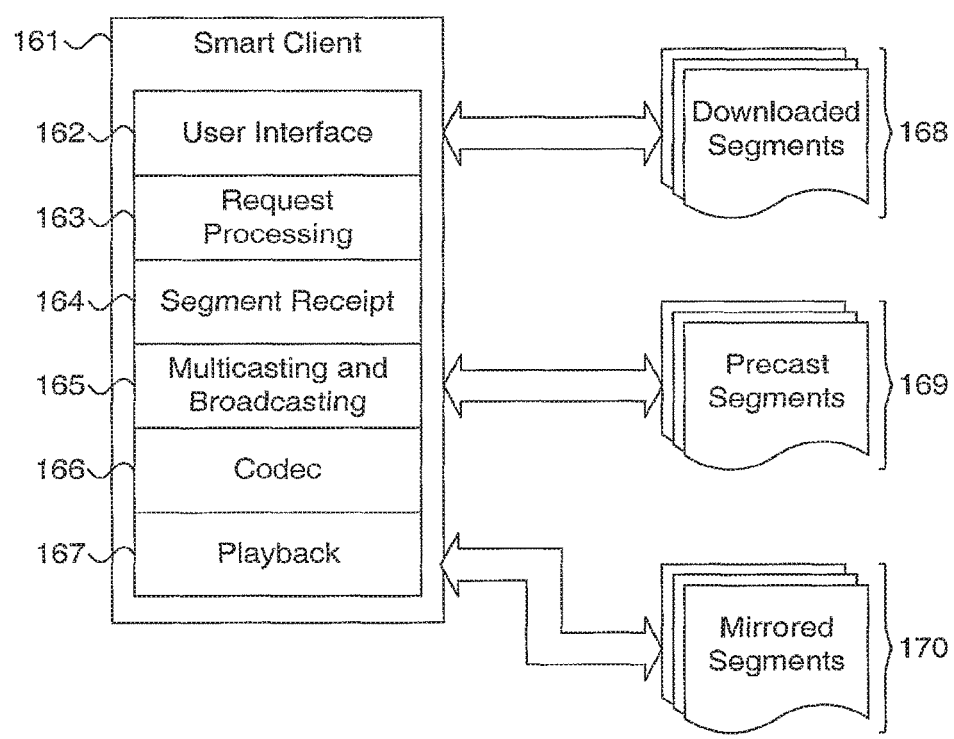
FIG. 8 is a block diagram showing the software modules of a Smart Client of FIG. 1.

FIG. 8 is a block diagram showing the software modules 160 of a Smart Client 161 of FIG. 1. Each Smart Client 161 initiates, facilitates and delivers media content to a requesting user. The Smart Client 161 includes: user interface module 162, request processing module 163, segment receipt module 164, multicasting and broadcasting module 165, codec module 166, and playback module 167.

The user interface module 162 provides controls to select media content for delivery. The request processing module 163 forms a request for media content that is sent to the Neuro Center (shown in FIG. 1) to initiate content delivery. The segment receipt module 164 receives individual downloaded segments 168 from the Neuro Nodes, Edge Servers, and, in a further embodiment, Smart Clients. A "pulse" is sent over the network via the multicasting and broadcasting module 165 to determine the current status of the network. The segment receipt module 164 also receives pre-cast segments 169 sent by the Neuro Center during off-peak times. Similarly, the segment receipt module 164 stages mirrored segments 170 received from Neuro Nodes when providing peer-to-peer intercommunications, in accordance with a further embodiment. The codec module 166 decompresses the individual downloaded segments 168 and pre-cast segments 169. The codec module 166 performs decryption of each individual segment including the decryption by a unique key through use of the play ticket 110 and validation certificate 111 (both shown in FIG. 5). Finally, the playback module 167 provides full-feature playback functionality, including play, pause, stop, rewind, fast forward, full screen, chapter stops, shuttle bar, and similar features.

Each module in the Neuro Center 101, Neuro Node 121, Edge Server 141, and Smart Client 161 is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The system operates in accordance with a sequence of process steps, as further described below with reference to FIG. 12.

FIG. 9 is a data structure diagram showing a play ticket 180 used by the system 10 of FIG. 1. Each play ticket 180 is used to transact the purchase or rental of delivered media content. Briefly, a play ticket 180 is issued on an individual customer basis and contains information about the movie ordered. Only a portion of the movie key for each movie is stored on a play ticket 180 to disable decryption and safeguard against theft and unauthorized access. The movie key also prevents reuse of the play ticket 180.

When a customer orders media content from a Neuro Center (shown in FIG. 1), a play ticket 180 is generated and includes the following:
(1) Certificate serial number (181) for the ticket;
(2) Customer number (182);
(3) Creation date and time (183);
(4) Expiration date and time (184);
(5) Movie title number (185);
(6) Number of plays (186)
(7) Reserved (187)
(8) Movie key (Part 1) (188); and
(9) Certificate signature (189).

The Certificate signature 189 is a digital signature prepared using symmetric public key encryption. The certificate signature 189 ensures the ticket cannot be altered without validation. As well, the movie key part 1188 includes only a portion of the entire movie key, which is split into two pieces between the play ticket 180 and a validation certificate 200 (shown below in FIG. 10).

In the described embodiment, each play ticket 180 has a 96-byte structure containing all information necessary to validate the play ticket. The certificate serial number 181 is used as a record lookup key into the ticket database 118 (shown in FIG. 5). The customer number 182 and movie title number 185 are also stored in the ticket database 118 and validated when the play ticket is used.

Before the play ticket 180 is presented for validation by the Neuro Center, the Smart Client checks the certificate signature 189 for validity. The certificate signature 189 includes a checksum of the certificate consisting of the first 64 bytes which are cryptographically signed using the Digital Signature Standard (DSS). If the play ticket 180 has been altered, the certificate signature 189 will not match and the signature validation will fail.

The number of plays field 186 can contain either a special numeric value indicating the ticket is good for unlimited plays, that is, the user has purchased the media content, or a numeric value indicating the number of plays remaining in a rental of the media content. Unlimited play tickets 180 do not have an expiration date and time 184.

Generally, all other play tickets 180 are good for only one play. If the number of plays in the play ticket 180 is greater than one, the play ticket 180 must be replaced. When validated, a replacement play ticket 180 is also returned with the number of plays field 186 reduced and a new certificate serial number 181 issued.

FIG. 10 is a data structure diagram showing a validation certificate 200 used by the system 10 of FIG. 1. Each validation certificate 200 includes essentially the same information as a play ticket 180 as follows:
(1) Certificate serial number (201) for the validation certificate;
(2) Customer number (202);
(3) Creation date and time (203);
(4) Expiration date and time (204);
(5) Movie title number (205);
(6) Reserved (206);
(7) Movie key (Part 2) (207); and
(8) Certificate signature (208).

Like the play ticket 180, the Neuro Node validates each validation certificate 200 using the certificate signature 208. If the certificate signature 208 does not match, the validation certificate 200 is invalid. The validation certificate 200 includes the other remaining portion of the movie key Part 2 207.

In the described embodiment, each movie key is split into two parts by using a second 128-bit random number generated using the same operations as used to generated the movie key Part 1. The second 128-bit random number is used as a split filter using an exclusive OR operation against the full movie key. The value used to split the key becomes the validation key.

Play tickets are computed according to the following operation:

$$K_2 = K_M \oplus K_1$$

where:
$K_M$ is the Movie Key
$K_1$ is the Validation Key (Split Value)
$K_2$ is the Play Ticket Key The validation key is stored in the ticket database 118, along with the other information necessary to validate the play ticket 180. The play ticket key becomes part of the play ticket 180.

During the later validation phase, after the play ticket information has been validated against the ticket database 118, a validation certificate 200 is generated and sent to the user. This certificate includes the validation key. The full movie key is recovered by using an exclusive OR of the two values to reverse the split process and recover the original key.

FIG. 11 is a data structure diagram showing a packet header 220 used by the system 10 of FIG. 1. A packet header 220 is prepended to each segment to enable a Smart Client (shown in FIG. 1) to reassemble the media content and enable playback. In the described embodiment, the individual data packets are sent in accordance with the Tranz-Cast Delivery Protocol (TCDP), a data exchange network based on the Reliable Multicast Framework (RMF).

The fixed header of each TCDP data packet contains the following fields:
(1) Sources (221): port number from which the packet was sent;
(2) Destination (222): port number to which the packet was directed;
(3) Packet Length (223): contains a count of octets in the packet, including the header and data;
(4) Checksum (224): corresponds to the Internet protocol checksum;
(5) Type (225): identifies the type of packet;
(6) Data Owner (226): contains a unique identifier for the originator of the data. Together with the sequence number, the contents of this field uniquely define a packet when multiple senders share a common multicast address;
(7) Sequence Number (227): increments by one for each new packet sent and may be used by the receiver to detect packet loss and to restore packet sequence;
(8) Header Extensions (228): indicates the presence of a header extension field; and
(9) Data (229): Variable payload data is appended to the end of the header 220 and may be of any length, including zero, as specified by the type field. Other types and combinations of fields are possible, as would be recognized by one skilled in the art.

Figure 12:
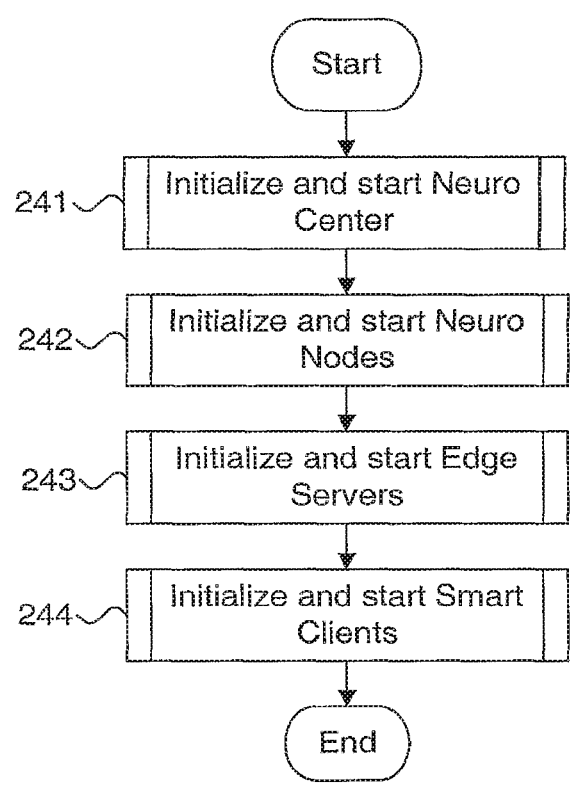
FIG. 12 is a flow diagram showing a method for providing load balanced secure media content delivery in a distributed computing environment.

FIG. 12 is a flow diagram showing a method for providing load balanced secure media content delivery 240 in a distributed computing environment. Each of the individual components, the Neuro Center, Neuro Nodes, Edge Servers, and Smart Clients, operate independently following initialization and start-up (blocks 241-244, respectively). With the exception of the Neuro Center, the various components can initiate and terminate their respective processing asynchronously without significantly affecting the continued operation of the remaining components. Following initialization and start-up, the method completes.

Figure 13:
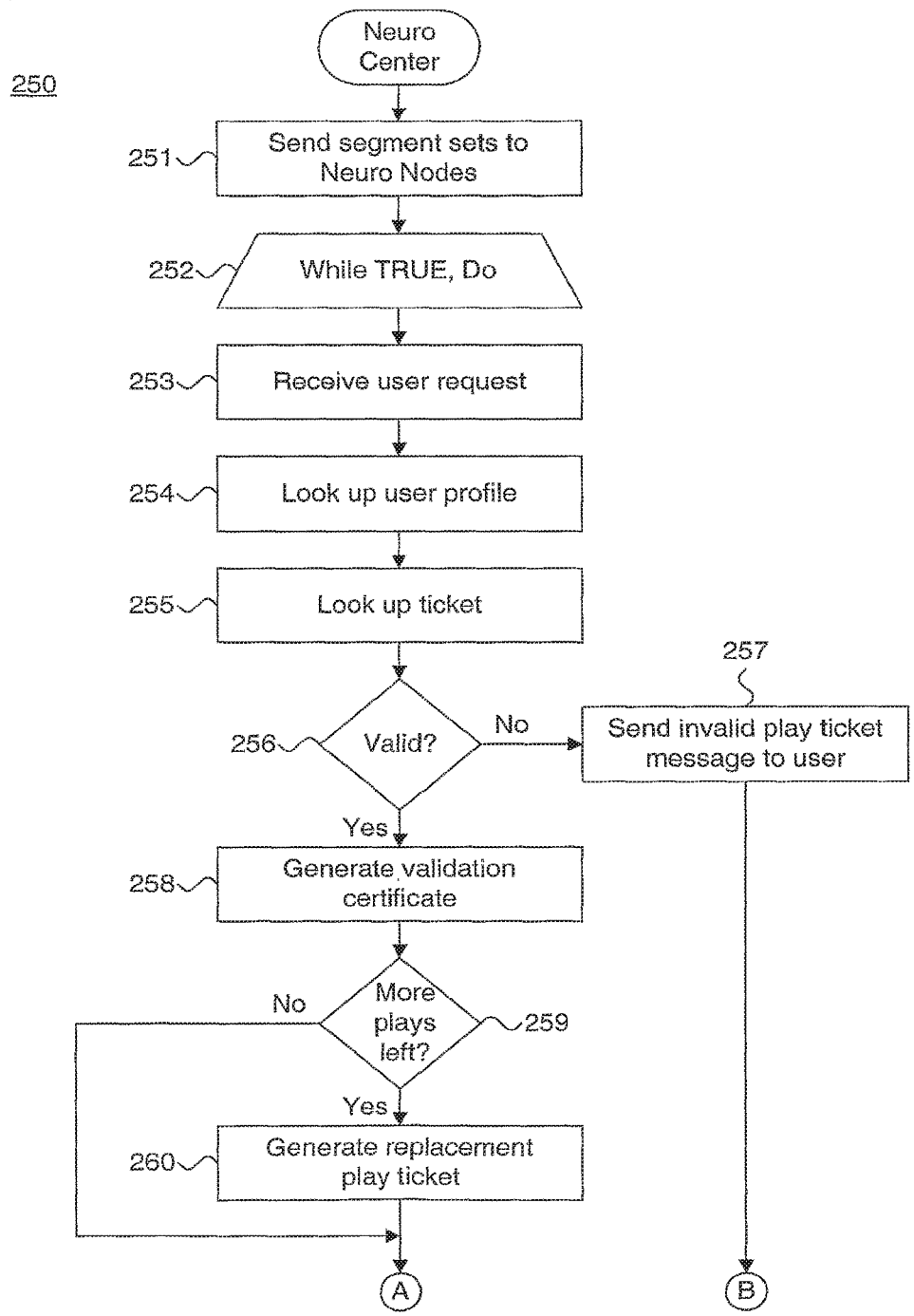
FIG. 13 is a flow diagram showing a routine for performing the operations of the Neuro Center for use in the method of FIG. 12.
Figure 13:
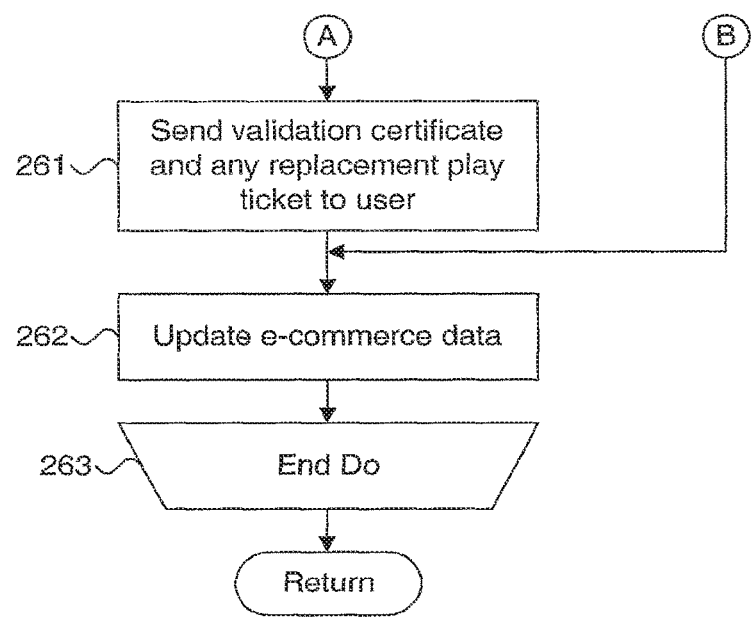

FIG. 13 is a flow diagram showing a routine for performing the operations of the Neuro Center 250 for use in the method of FIG. 12. The purpose of this routine is to initially, and as necessary, stage complete segment sets to Neuro Nodes for mirroring and validate individual user requests.

Thus, complete sets of segments 115 (shown in FIG. 5) are sent to Neuro Nodes (block 251). Thereafter, user requests are processed in an iterative processing loop (block 252-263) as follows. During each iteration (block 252), a user request is received (block 253) from a Smart Client and the corresponding user profile 116 is looked up (block 254). The play ticket 180 (shown in FIG. 9) is looked up in the ticket database 118 (block 255) and, if valid (block 256), a validation certificate 200 (shown in FIG. 10) is generated (block 258). If more plays are left on the play ticket 180 (block 259), a replacement play ticket 180 is generated (block 260). The validation certificate 200 and a replacement play ticket 180 are sent to the user (block 261) and the e-commerce data 117 is updated (block 262).

If the play ticket 180 is not valid (block 256), an invalid play ticket message is sent to the user (block 257) and the e-commerce data is updated (block 262). Processing continues with each subsequent user request (block 263), after which the routine returns.

Figure 14:
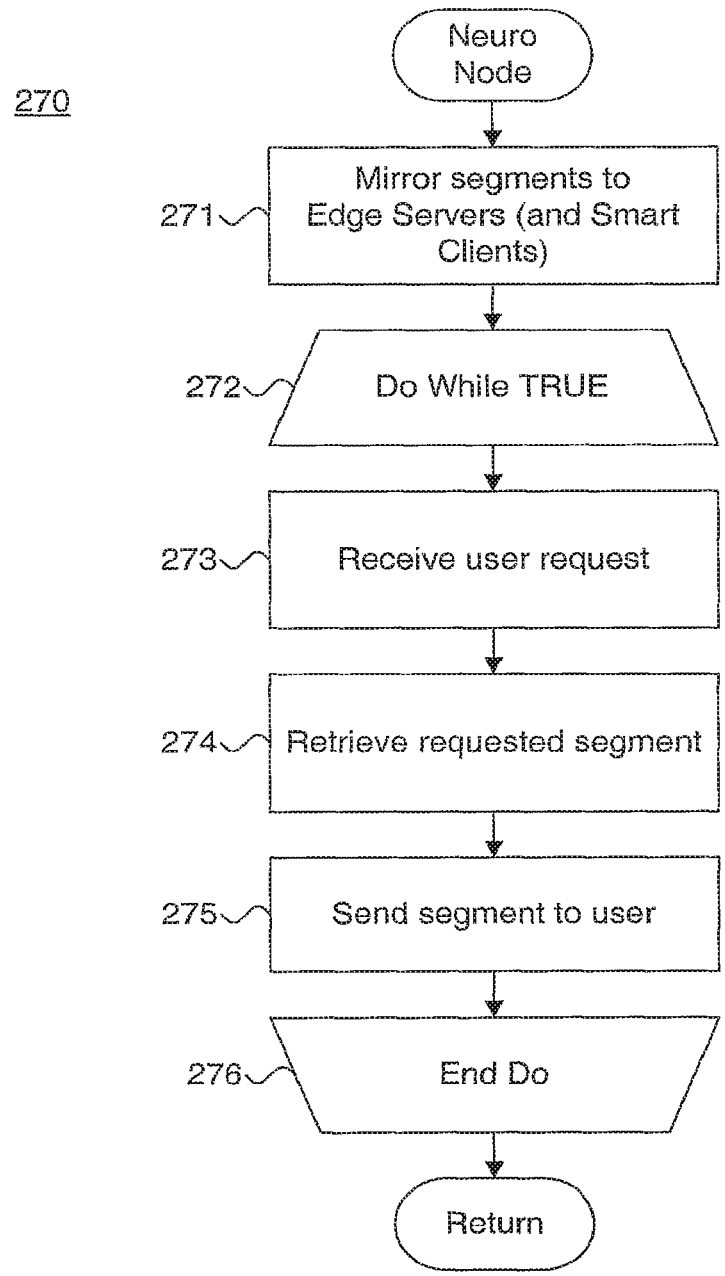
FIG. 14 is a flow diagram showing a routine for performing the operations of a Neuro Node for use in the method of FIG. 12.

FIG. 14 is a flow diagram showing a routine for performing the operations of a Neuro Node 270 for use in the method of FIG. 12. The purpose of this routine is to mirror individual encrypted segments to the Neuro Nodes and to deliver requested segments to Smart Clients.

Thus, initially and as required thereafter, individual encrypted segments 128 (shown in FIG. 6) are mirrored to Neuro Nodes and, in a further embodiment, to Smart Clients, for providing load balancing and optimal retrieval of media content over the network (block 271). User requests are then processed in an iterative processing loop (blocks 272-276) as follows. During each iteration (block 272), a user request is received (block 273) from a Smart Client. The requested segment 128 is retrieved (block 274) from the segment storage and sent to the requesting user (block 275). Iterative processing continues (block 276) until the Neuro Node terminates, after which the routine returns.

Figure 15:
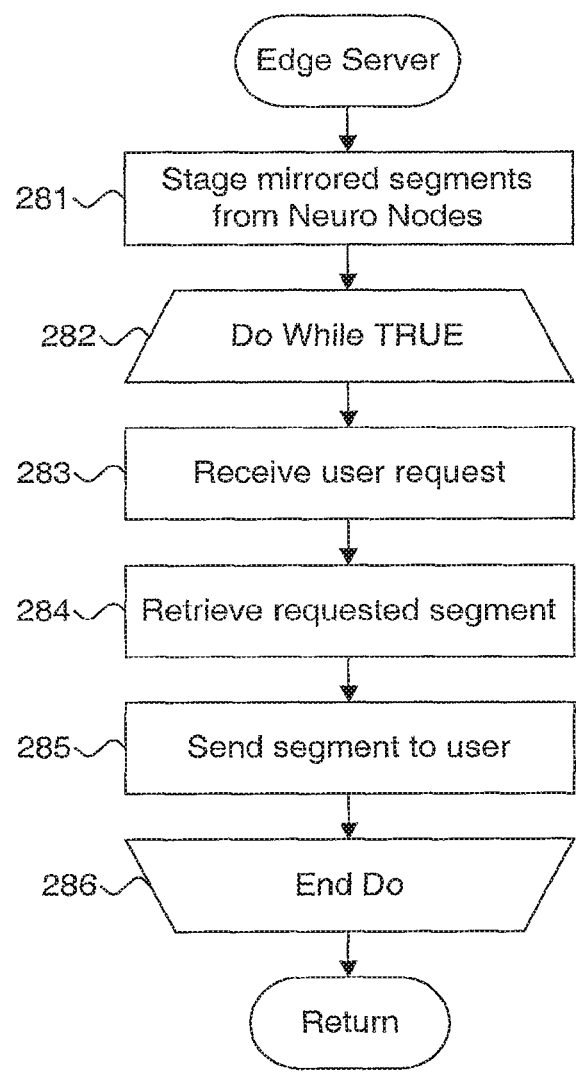
FIG. 15 is a flow diagram showing a routine for performing the operations of an Edge Server for use in the method of FIG. 12.

FIG. 15 is a flow diagram showing a routine for performing the operations of an Edge Server 280 for use in the method of FIG. 12. The purpose of this routine is to receive individual encrypted mirrored segments and to deliver requested segments to Smart Clients.

Thus, initially and as required thereafter, individual encrypted segments are received from Neuro Nodes and staged (block 281) as mirrored segments 148 (shown in FIG. 7). User requests are then processed in an iterative processing loop (blocks 282-286) as follows. During each iteration (block 282), a user request is received (block 283) from a Smart Client. The requested segment 128 is retrieved (block 284) from the segment storage and sent to the requesting user (block 285). Iterative processing continues (block 286) until the Edge Server terminates, after which the routine returns.

Figure 16:
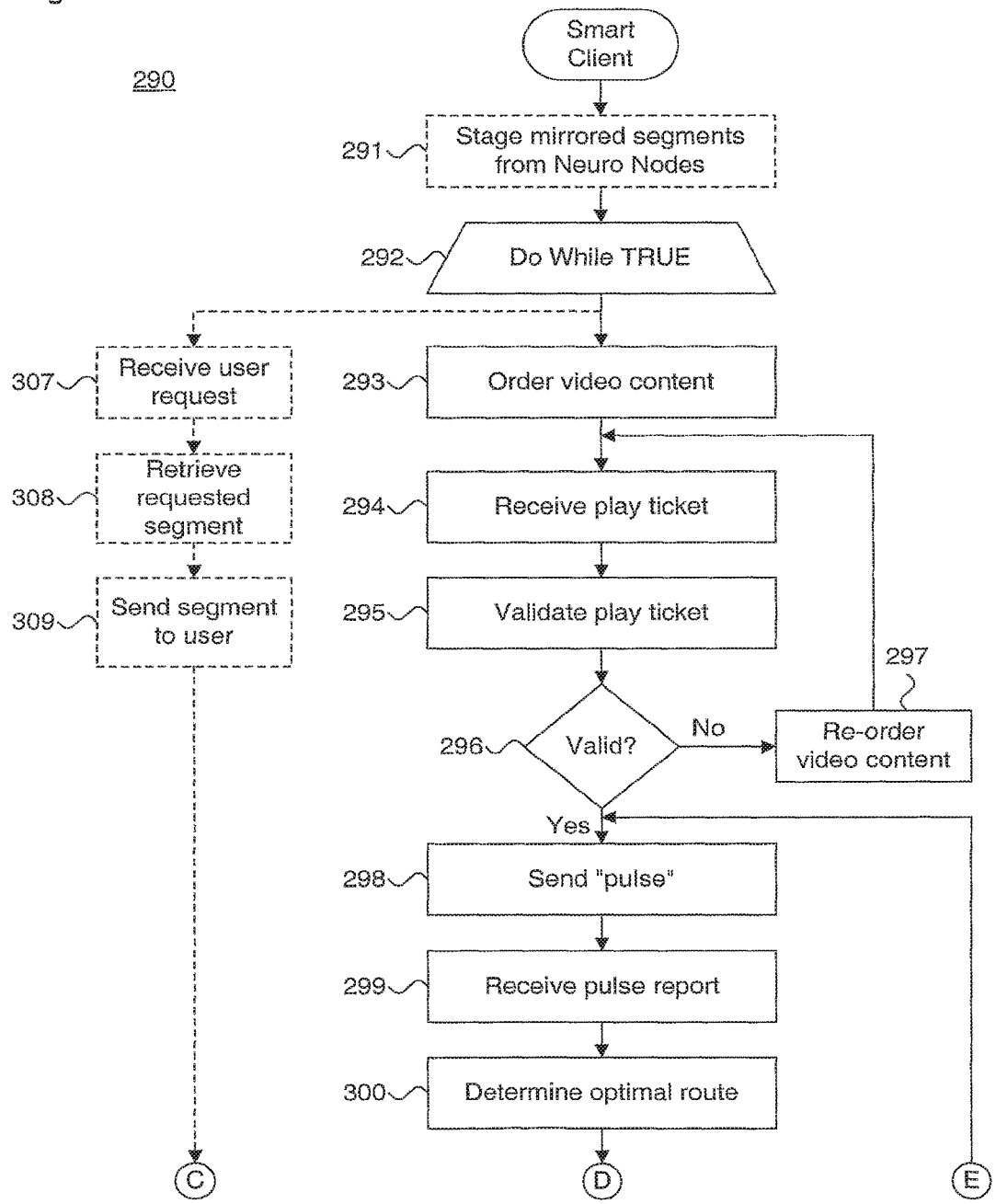
FIG. 16 is a flow diagram showing a routine for performing the operations of a Smart Client for use in the method of FIG. 12.
Figure 16:
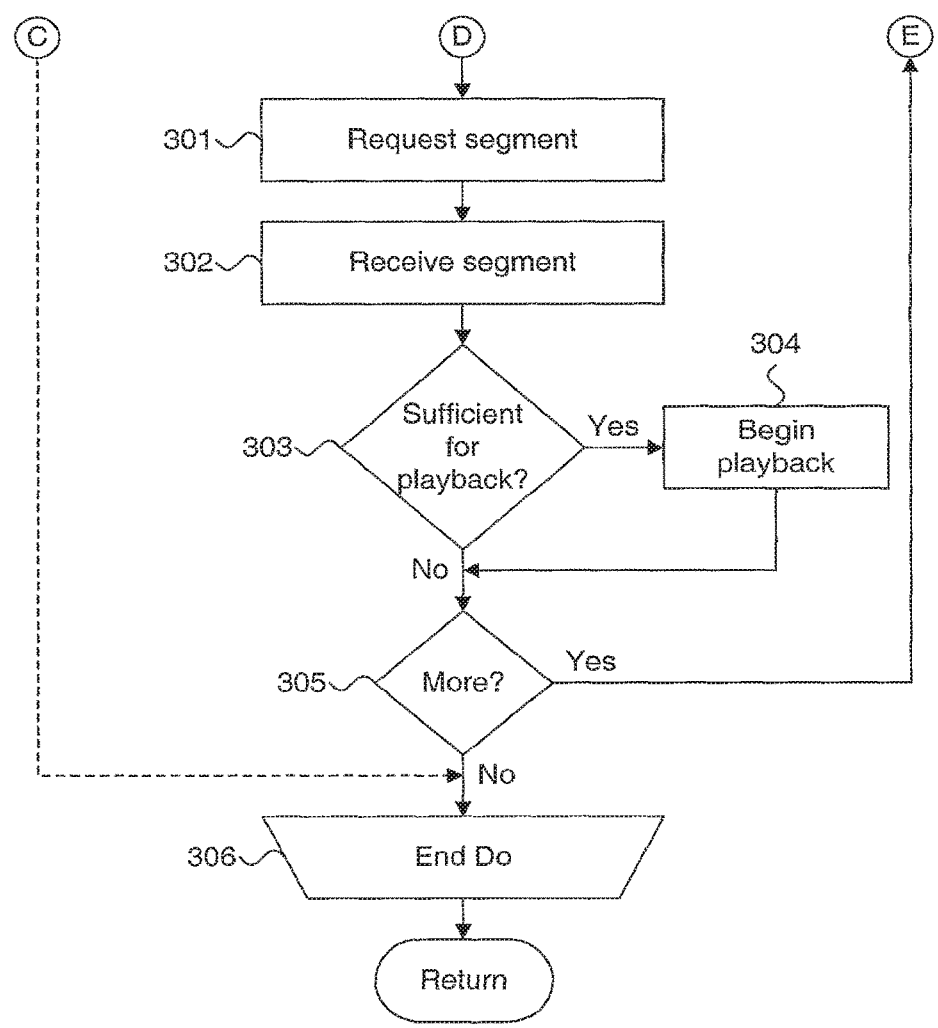

FIG. 16 is a flow diagram showing a routine for performing the operations of a Smart Client 290 for use in the method of FIG. 12. The purpose of this routine is to request delivery of and playback media content selected by a user. In a further embodiment, the Smart Client provides peer-to-peer intercommunications by serving individual encrypted mirrored segments to other Smart Clients.

Thus, in a further embodiment, individual encrypted mirrored segments 170 (shown in FIG. 8) are staged (block 291) for retrieval by peer Smart Clients. Thereafter, media content requests are processed in an iterative processing loop (blocks 292-306) as follows. During each iteration (block 292), media content is ordered (block 293) through the user interface 162. A play ticket 180 (shown in FIG. 9) is received from the Neuro Center (block 294) and validated by the Smart Client (block 295) by authenticating the certificate signature 189. If the play ticket 180 is not valid (block 296), the media content is re-ordered (block 297) from the Neuro Center.

The status of the network is determined prior to requesting each individual segment (blocks 298-300) as follows. First, a "pulse" is sent from the Smart Client (block 298) to the Neuro Nodes, Edge Servers and, in a further embodiment, peer Smart Clients. A pulse report is received back from each of the components (block 299) and an optimal route is determined (block 300) for each of the individual encrypted segments.

Each individual encrypted segment is requested (block 301) and received (block 302), preferably from an optimally sited network component. If segments sufficient for playback have been received (block 303), playback begins (block 304). Receipt of segments continues (block 305) until media content delivery is complete. Processing media content requests continues (block 306) until the Smart Client terminates.

In a further embodiment, the Smart Client sends individual encrypted mirrored segments 170 to peer Smart Clients upon request (blocks 307-109) as follows. A user request for an individual encrypted segment is received (block 307). The requested mirrored segment 170 is retrieved (block 308) and sent to the requesting user (block 309). The delivery of mirrored segments 170 from a peer Smart Client enables fuller network resource utilization and improved load balancing characteristics for the network.

While the invention has been particularly shown and described as referenced to the embodiments thereof, those skilled in the art will understand that the foregoing and other changes in form and detail may be made therein without departing from the spirit and scope of the invention.

What is claimed is:

1. A method for providing load balanced secure media content delivery in a distributed computing environment wherein the media content is segmented and encrypted into a set of individually encrypted segments, comprising:
   storing at least one individually encrypted segment of the set of individually encrypted segments at a plurality of intermediate servers, said individually encrypted segments adapted to be reassembled into the media content for media playback;
   receiving requests, from one or more client computers, for retrieving the media content on at least one server of the plurality of intermediate servers;
   queuing the requests from the one or more client computers on the at least one server; and
   multicasting the individually encrypted segments, from the at least one server, based on the requests, wherein multicasting the individually encrypted segments to the one or more client computers is performed from an optimally sited intermediate server.

2. The method according to claim 1, further comprising sending at least one individually encrypted segment of the set of individually encrypted segments for storage at the plurality of intermediate servers from at least one of the one or more client computers.

3. The method according to claim 1, wherein the media content comprises at least one of a video file, an audio file or a video game.

4. The method according to claim 1, wherein each client computer comprises at least one of a personal computer, a mobile phone or a set top device.

5. The method according to claim 1, wherein multicasting the individually encrypted segments is performed in a non-sequential order.

6. The method according to claim 1, further comprising maintaining a master database of user profiles.

7. The method according to claim 1, wherein the individually encrypted segments are variable in size.

8. The method according to claim 1, further comprising pre-casting at least one of the individually encrypted segments to the one or more client computers before a request for retrieving media content is received from the one or more client computers.

9. The method according to claim 1, further comprising receiving a pulse signal from the one or more client computers, said pulse signal is used to determine a status and performance of the plurality of intermediate servers.

10. The method according to claim 1, further comprising directing a client computer to transmit at least one of the individually encrypted segments to the one or more client computers that is requesting the media content.

11. A network for providing load balanced secure media content delivery in a distributed computing environment wherein the media content is segmented and encrypted into a set of individually encrypted segments, the network comprising:
 a plurality of intermediate servers adapted to store at least one individually encrypted segment of the set of individually encrypted segments, said individually encrypted segments adapted to be reassembled into the media content for media playback;
 a request processing module to receive requests, from one or more client computers, for retrieving the media content on at least one intermediate server of the plurality of intermediate servers; and
 a multicasting module to queue requests from the one or more client computers on the at least one intermediate server, and to multicast the individually encrypted segments, from the at least one intermediate server based on the requests, wherein the at least one intermediate server is an optimally sited intermediate server.

12. The network according to claim 11, wherein the media content comprises at least one of a video file, an audio file or a video game.

13. The network according to claim 11, wherein each client computer comprises at least one of a personal computer, a mobile phone or a set top device.

14. The network according to claim 11, wherein the multicasting module multicasts the individually encrypted segments in a non-sequential order.

15. The network according to claim 11, further comprising a master database of user profiles.

16. The network according to claim 11, wherein the individually encrypted segments are variable in size.

17. The network according to claim 11, wherein the multicasting module pre-casts at least one of the individually encrypted segments to the one or more client computers before a request for retrieving media content is received from the one or more client computers.

18. The network according to claim 11, further comprising a module to receive a pulse signal from the one or more client computers, wherein the pulse signal is used to determine a status and performance of the plurality of intermediate servers.

19. The network according to claim 11, further comprising a module to direct a client computer to transmit at least one of the individually encrypted segments to the one or more client computers that is requesting the media content.

* * * * *